(12) United States Patent
Song et al.

(10) Patent No.: US 10,416,723 B2
(45) Date of Patent: *Sep. 17, 2019

(54) DEFORMABLE ELECTRONIC DEVICE CONTROL FOR MULTIMEDIA INFORMATION

(71) Applicant: Lenovo (Beijing) Limited, Beijing (CN)

(72) Inventors: Ming Xiao Song, Beijing (CN); Jing Xi Yang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 104 days.

This patent is subject to a terminal disclaimer.

(21) Appl. No.: 15/465,381

(22) Filed: Mar. 21, 2017

(65) Prior Publication Data

US 2017/0269636 A1 Sep. 21, 2017

(30) Foreign Application Priority Data

Mar. 21, 2016 (CN) .......................... 2016 1 0162055

(51) Int. Cl.
*G06F 1/16* (2006.01)
*G06F 3/16* (2006.01)

(52) U.S. Cl.
CPC ............ *G06F 1/1652* (2013.01); *G06F 3/165* (2013.01); *G06F 2203/04102* (2013.01); *G09G 2380/02* (2013.01)

(58) Field of Classification Search
CPC ......... G06F 1/1652; G06F 2203/04102; G06F 3/165; G09G 2380/02; H01L 51/0097; H01L 2251/5338; G02F 1/133305; G09F 9/301; H04M 1/0268
See application file for complete search history.

(56) References Cited

U.S. PATENT DOCUMENTS

| | | | | |
|---|---|---|---|---|
| 2011/0095975 A1* | 4/2011 | Hwang | ................. | G06F 1/1626 345/156 |
| 2012/0075166 A1* | 3/2012 | Marti | ...................... | G06F 3/011 345/1.1 |
| 2012/0313862 A1* | 12/2012 | Ko | ....................... | G09G 3/3433 345/173 |
| 2013/0076605 A1* | 3/2013 | Cope | ................. | G02F 1/133305 345/87 |
| 2014/0004906 A1* | 1/2014 | Chi | ......................... | H04B 1/38 455/566 |
| 2014/0029017 A1* | 1/2014 | Lee | ........................ | G01B 11/24 356/601 |

(Continued)

FOREIGN PATENT DOCUMENTS

CN 103176735 A 6/2013
CN 104317396 A 1/2015
(Continued)

*Primary Examiner* — Darlene M Ritchie
(74) *Attorney, Agent, or Firm* — Kunzler Bean & Adamson

(57) ABSTRACT

A presented method includes acquiring a first parameter of a multimedia information in response to acquisition of the multimedia information; determining a deformation parameter of the deformable electronic device according to the first parameter; controlling the deformable electronic device to deform according to the deformation parameter; and outputting the multimedia information.

15 Claims, 3 Drawing Sheets

201

(56) References Cited

U.S. PATENT DOCUMENTS

| | | | |
|---|---|---|---|
| 2014/0111549 A1* | 4/2014 | Vanska | G06F 1/1626 345/656 |
| 2014/0241551 A1* | 8/2014 | Kim | H04R 1/02 381/306 |
| 2014/0320393 A1* | 10/2014 | Modarres | G06F 3/017 345/156 |
| 2014/0354791 A1* | 12/2014 | Lee | G06K 9/00228 348/77 |
| 2015/0049090 A1* | 2/2015 | Kim | G06F 3/0487 345/442 |
| 2016/0035310 A1* | 2/2016 | Song | G06F 3/017 345/156 |
| 2016/0054799 A1* | 2/2016 | Levesque | G06F 3/041 345/173 |
| 2016/0117962 A1* | 4/2016 | Jung | G09G 3/20 345/156 |
| 2016/0150342 A1* | 5/2016 | Choi | H04S 7/303 381/17 |
| 2016/0205391 A1* | 7/2016 | Kim | G09G 3/3225 348/51 |
| 2017/0052566 A1* | 2/2017 | Ka | G06F 3/0483 |
| 2017/0230751 A1* | 8/2017 | Yu | H04R 1/403 |

FOREIGN PATENT DOCUMENTS

| | | |
|---|---|---|
| CN | 104539764 A | 4/2015 |
| CN | 104955285 A | 9/2015 |
| CN | 105094333 A | 11/2015 |

\* cited by examiner

DEFORMABLE ELECTRONIC DEVICE CONTROL FOR MULTIMEDIA INFORMATION

FIELD

The subject matter disclosed herein relates to the field of electronic technologies, and in particular, to an information processing method and a deformable electronic device.

BACKGROUND

With the rapid development of science and technology as well as the advancement of information processing technology, more and more smart terminals are used in people's daily lives and work places. For example: mobile phones, tablet PCs, laptops, and deformable electronic devices. Compared with conventional electronic devices, the deformable electronic device is not only lighter in volume, but also consumes less power than that of the conventional devices, which can greatly improve the duration capability of the device.

SUMMARY

One embodiment of the present disclosure, a method is presented. The method includes acquiring a first parameter of a multimedia information in response to acquisition of the multimedia information. The method also includes determining a deformation parameter of the deformable electronic device according to the first parameter. The method also includes controlling the deformable electronic device to deform according to the deformation parameter. The method also includes outputting the multimedia information.

In another embodiment of the present disclosure, a device is disclosed. The device includes a storage unit and at least one processor. The storage unit stores at least one program module. The at least one processor acquires a first parameter of multimedia information by acquiring and running the at least one program module in response to acquisition of the multimedia information. The at least one processor also determines a deformation parameter of a deformable electronic device according to the first parameter. The at least one processor also controls the electronic device to deform according to the deformation parameter. The at least one processor also outputs the multimedia information.

In another embodiment of the present disclosure, a system is presented. The system includes a first acquisition unit, a first determination unit, and a first output unit. The first acquisition unit acquires a first parameter of a multimedia information in response to acquisition of the multimedia information. The first determination unit determines a deformation parameter of the deformable electronic device according to the first parameter. The first output unit controls the deformable electronic device to deform according to the deformation parameter. The first output unit also outputs the multimedia information.

Some preferred but optional features or steps of the present application have been defined in the dependent claims.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

The embodiments described herein provides an information processing method and a deformable electronic device, for solving the technical problem of being unable to automatically match a proper form of the deformable electronic device for outputting media according to the multimedia information when the multimedia information is output.

In the technical solution provided in the embodiments described herein, the deformable electronic device acquires a parameter from a media item. The media item such as a piece of music, a sound clip, a movie, an image, etc. The media item contains multimedia information.

Therefore, the technical problem that conventional devices cannot automatically match a proper form for outputting the multimedia information is effectively solved, and a proper form can be automatically matched to the multimedia information, so that the deformable electronic device can output the multimedia information in the proper deformable device form, thereby better satisfying user needs and achieving the technical effects of a better user experience.

The main implementation principles, the particular implementation modes of the technical solutions of the embodiments described herein, and their respective beneficial effects that can be achieved by these technical solutions will be described in detail below with reference to the accompanying drawings.

In some embodiments, the information processing method can be applicable to an electronic device. The deformable electronic device can be a deformable flexible electronic device, such as a flexible screen or other electronic devices, therefore it will not be illustrated one by one herein.

Figure 1:
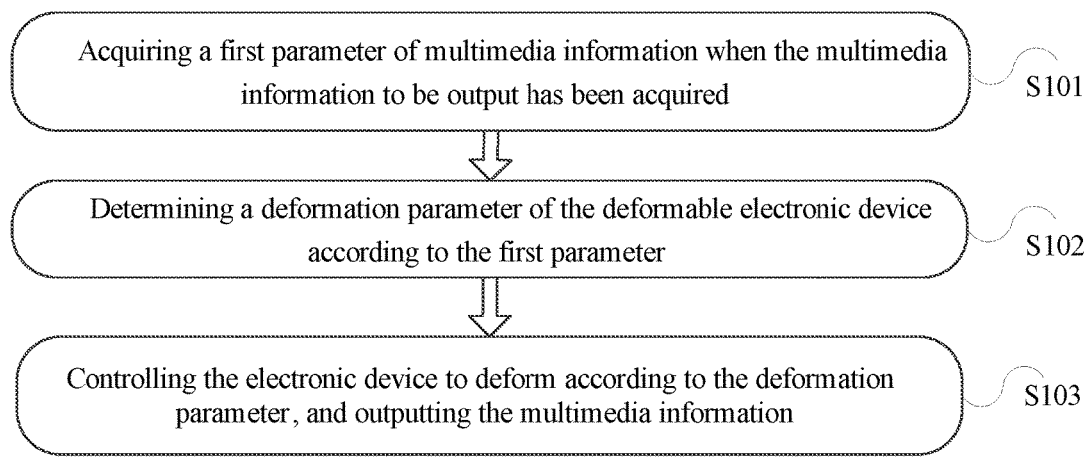
FIG. 1 is a flow diagram illustrating one embodiment of an information processing method.

Referring to FIG. 1, the illustrate embodiment provides an information processing method applicable to a deformable electronic device. At block S101, a first parameter of the multimedia information is acquired when the multimedia information to be output has been acquired.

At block S102 a deformation parameter of the deformable electronic device is determined according to the first parameter. At block S103, the electronic device is controlled to deform according to the deformation parameter and the multimedia information is output.

Specifically, in this embodiment, the deformable electronic device can output different multimedia information, such as audio, video, images and documents. The deformation parameters corresponding to the various multimedia information are pre-stored in the deformable electronic device, i.e. the deformable electronic device can automatically determine the corresponding deformation parameter according to the parameter of the multimedia information, and then the deformation electronic device outputs the multimedia information after the deformation electronic device is deformed to be of a form adapted to the multimedia information according to the determined deformation parameter. For example, when the deformable electronic device acquires the multimedia information to be output and the first parameter of the multimedia information indicates that the multimedia information is a document information, the deformable electronic device can output the document information according to the deformation of the deformation parameter corresponding to the document information, for instance, the deformation parameter is deformed to be of a form with the display screen facing the user.

In this way, the deformable electronic device does not need the user to manually adjust the form of the deformable electronic device while displaying the multimedia information, rather, the deformable electronic device can adjust the form automatically according to the parameter of the multimedia information when the deformable electronic device outputs the multimedia information. Therefore, the technical problem that conventional deformable electronic devices cannot automatically match a proper form to output the multimedia information is effectively solved, thereby better satisfying user needs and achieving the technical effects of a better user experience.

In one embodiment, the step S102 of determining a deformation parameter of the deformable electronic device according to the first parameter can be realized by determining, from the first parameter, a multimedia information type and determining the deformation parameter from the multimedia information type. In some embodiments, the deformation parameter is a pre-stored deformation parameter which corresponds to the multimedia information type. The pre-stored deformation parameter may be stored locally on the deformable electronic device or remote to the deformable electronic device. In some embodiments, the deformation parameter includes a sound output direction which constitutes one or more sound directions.

In some embodiments, the multimedia type is determined as the audio type when the first parameter is an audio parameter and the audio parameter indicates that the multimedia information is a non-monophonic audio. The multimedia information type may also include a video, image, document, or other media item or file. In the case of a video item or other item that has an associated visual element, a screen of the deformable electronic device may be deformed (i.e. bent or curved) according to a bending degree characterized by the deformation parameter.

In another embodiment, the first parameter of the multimedia information can be attribute information of the multimedia information, such as the type, opening mode, and document size of the multimedia document, and the type of multimedia information can be determined according to the first parameter of the multimedia information. For example: when the acquired first parameter of the multimedia information indicates the type of multimedia information is A and the opening mode is B, then the type (audio, video, image or document) of the multimedia information can be determined. As the forms of the most properly adapted deformable electronic device according to different types of the multimedia information are different, the deformation parameters corresponding to the various types of multimedia information are pre-stored in the deformable electronic device. In this way, the deformable electronic device can determine the proper deformation parameter matched automatically with the type according to the determined type of multimedia information when outputting the multimedia information, and output the multimedia information after the deformation according to the deformation parameter through automatic adjustment. Thus the user does not need to manually adjust the form of the deformable electronic device repeatedly, thereby better satisfying the demands of the user and improving the user experience. In this embodiment, the deformation parameter comprises a parameter characterizing the bending degree of the screen of the deformable electronic device, such as curved. The deformable electronic device is deformed according to the bending degree of the screen corresponding to the multimedia information.

Figure 2A:
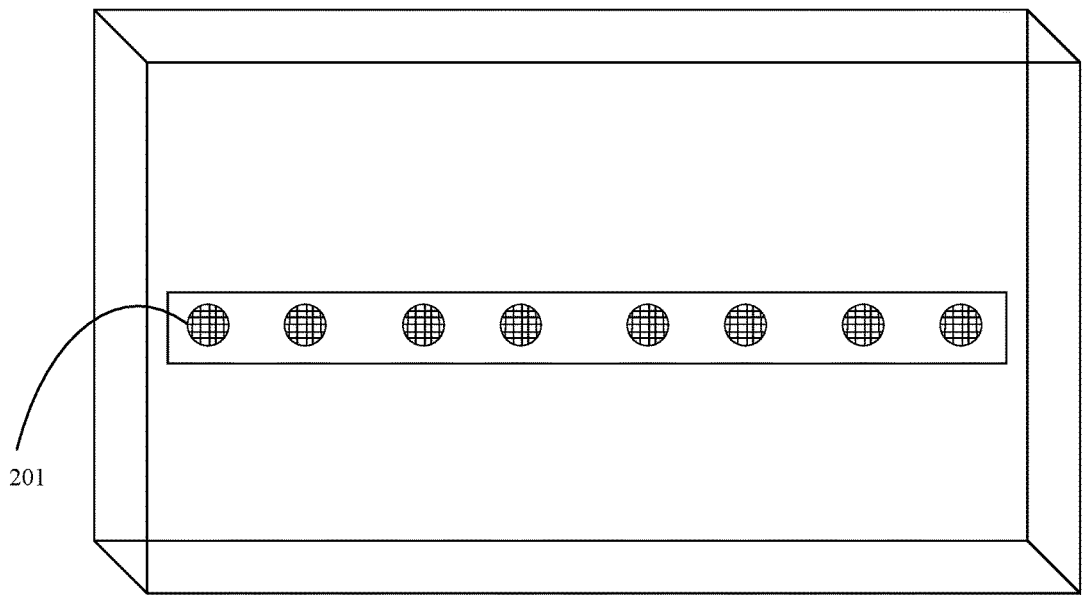
FIG. 2A is a schematic diagram of one embodiment of an original state of the deformable electronic device.
Figure 2B:
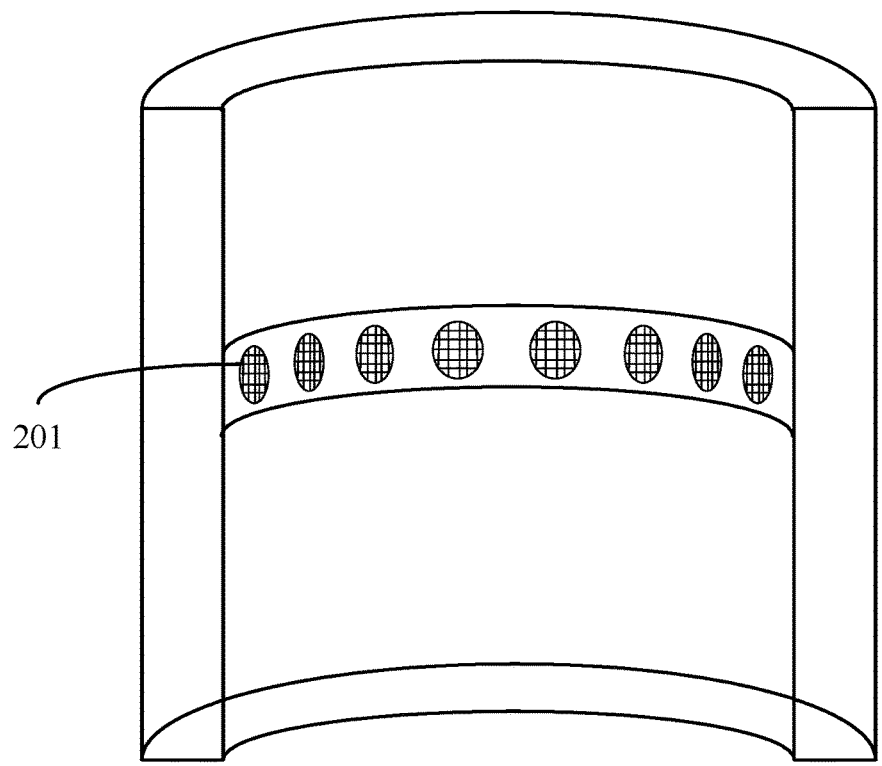
FIG. 2B is a schematic diagram of one embodiment of the deformable electronic device outputting audio information.

Furthermore, in this embodiment, when the determined multimedia information is an audio type, the pre-stored deformation parameter corresponding to the audio type in the deformable electronic device specifically comprises those parameters that specify the sound output direction from the sound output unit of the deformable electronic device to be in at least two different directions. Specifically, the initial state of the deformable electronic device is shown in FIG. 2a, with the deformable electronic device being provided with many sound output units 201. As for the user, the user experience is at its best when the deformable electronic device outputs the audio in stereophonic effect with respect to the audio type of multimedia information. Therefore, the deformation parameter corresponding to the audio type is the parameter that describes the sound output direction from the sound output unit of the deformable electronic device to be in at least two different directions, as shown in FIG. 2b, and the deformable electronic device can be deformed to be slightly annular. In the illustrated annually deformed state, the sound output unit 201 provided on the deformable electronic device outputs sound in different directions, producing a surround sound effect.

In some embodiments, the corresponding first parameter can also be pre-defined in various types of multimedia information. For example, as for the audio information, the user can define the first parameter as mono audio or non-monophonic audio as required. If the user defines the first parameter corresponding to Audio A as the monophonic audio, and the first parameter corresponding to Audio B as the non-monophonic audio, the deformation parameter corresponding to the mono audio in the deformable electronic device is the parameter that causes the sound output direction from the sound output unit provided on the deformable electronic device to be in the same direction. Additionally, the deformation parameter corresponding to the non-monophonic audio is the parameter that causes the sound output direction from the sound output unit provided on the deformable electronic device to be in different directions. Furthermore, when the acquired first parameter corresponding to Audio A is a monophonic audio as the deformable electronic device outputs Audio A, the deformation parameter is further determined as the parameter that causes the sound output direction from the sound output unit provided on the deformable electronic device to be in the same direction.

Furthermore, the deformable electronic device can deform into the form as shown in FIG. 2a. Similarly, when the acquired first parameter corresponding to Audio B is a non-monophonic audio as the deformable electronic device outputs Audio B, the deformation parameter is further determined as the parameter that causes the sound output direction from the sound output unit provided on the deformable electronic device to be in different directions. Furthermore, the deformable electronic device can deform into the form as shown in FIG. 2b. In this way, the deformable electronic device can be deformed to be of a form adapted to the first parameter of the audio information, thereby better satisfying user needs.

Figure 3:
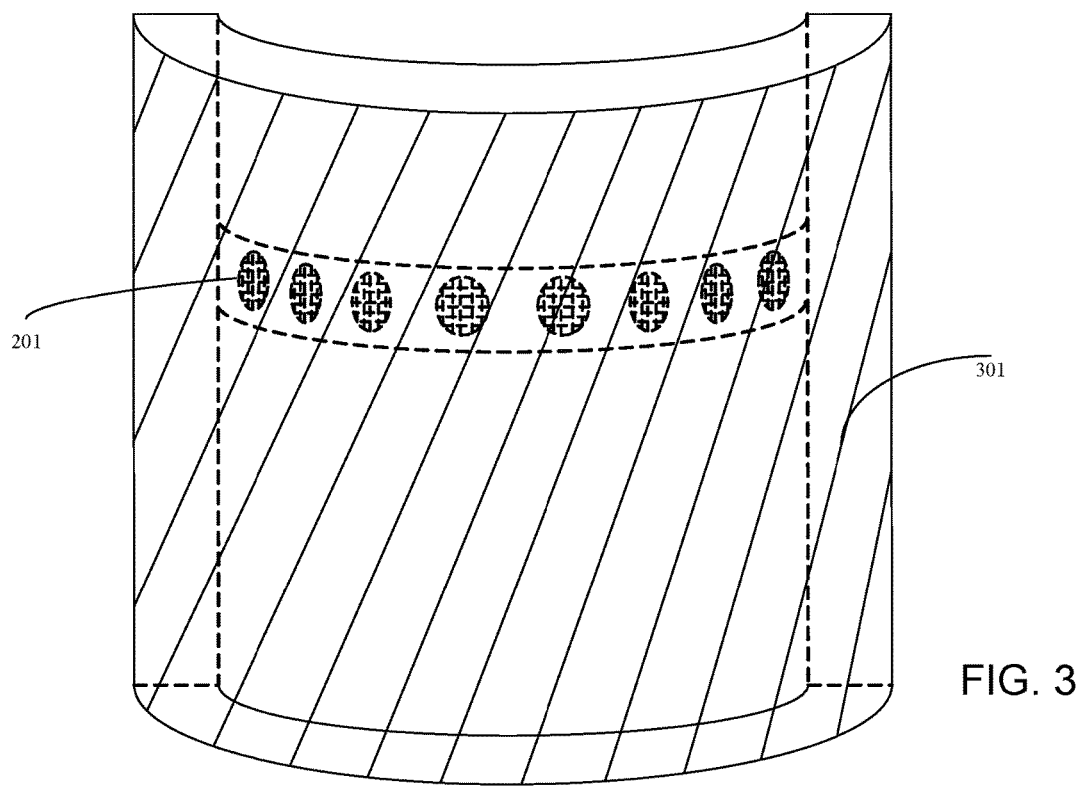
FIG. 3 is a schematic diagram of one embodiment of the deformable electronic device outputting video information.

Similarly, as shown in FIG. 3, the deformable electronic device can also output the information, such as video, documents, and images, in addition to the audio type of the multimedia information. The deformable electronic device may ensure the deformed form of the display screen 301 can be facing the user when outputting the documents and image information, thereby facilitating the user to view the contents. For video information, images and sounds will need to be output, and in order to improve users' visual and listening experience, the deformation parameter corresponding to the video information is to cause the sound output direction from the sound output unit 201 of the deformable electronic device after deformation to be in at least two different directions. In practical application, the correspondence between the first parameter of multimedia information and the deformation parameter can be set according to actual needs, thus the illustrated embodiment does not specify this.

Furthermore, the information processing method in this embodiment can also set the correspondence between the first parameter of multimedia information and the deformation parameter according to users' operation. Specifically, in some embodiments, the deformable device presents a media item in a deformable form specific to the media item but receives a user input specifying a form separate from the form corresponding to the media item currently being presented. In response to the user input, the deformable electronic device assumes the user input specified form. In some embodiments, the deformable electronic device may adjust the presentation of the media item (i.e. screen display properties or audio stage) to accommodate the user input specified form.

In other words, in this embodiment, the deformable electronic device records the deformation parameter after deformation, such as curved; and the bending degree when the deformable electronic device detects users' deformation operations for the deformable electronic device, for example, the deformable electronic device is bent or straightened by pulling. In response to the users' deformation of the device, the deformable electronic device determines the multimedia information currently being output or to be output in order to acquire the type parameter of the multimedia information, for example, acquiring the type parameter of the multimedia information, thus the deformable electronic device can establish the correspondence between the first parameter of multimedia information and the deformation parameter of the deformable electronic device. Then the deformation parameter corresponding to the multimedia information can be matched automatically in the next output. For example, when the deformable electronic device plays the audio information A, a user bends it according to the first curvature, and the deformable electronic device acquires the first parameter corresponding to the audio information A as the first audio type, so as to establish the correspondence between the first audio type and the first curvature. In this case, the audio information A is acquired as the first audio type in the next output of the audio information A, and then the deformation parameter corresponding to this can be matched automatically as the first curvature; and the deformable electronic device will output the audio information A after deformation according to the first curvature. In this way, the deformable electronic device can output multimedia information in a user's preferred form, in order to better satisfy user needs and improve user experience.

Figure 4:
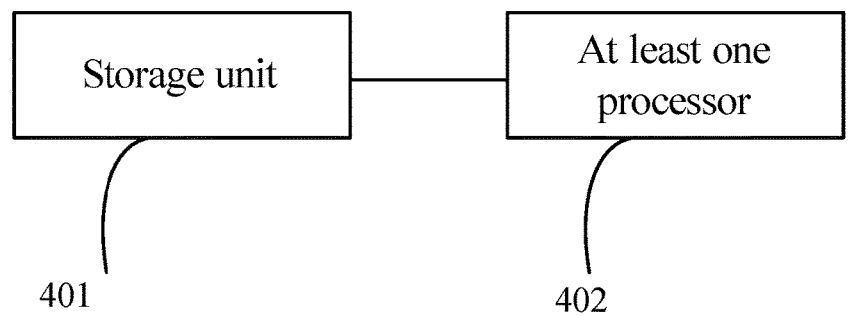
FIG. 4 is a structural view of one embodiment of a deformable electronic device.

Referring to FIG. 4, the embodiment described herein further provides an electronic device. The illustrated embodiment includes a storage unit 401 that stores at least one program module and at least one processor 402. The processor 402 acquires parameters from the multimedia information through execution of the at least one program module from the storate unit 401. Specifically, the processor 402 also determines a deformation parameter from the multimedia information and sets the deformable electronic device to the corresponding form. The processor 402 also outputs the multimedia information.

In some embodiments, the processor 402 analyzes the multimedia information to determine a multimedia information type and correlates the type to a particular deformation parameter. The deformation parameter identified by the processor 402 may relate to a bending degree for the screen or an arrangement to accommodate a sound stage for audio.

In some embodiments, the at least one processor 402 is capable of determining whether an audio element in monophonic or non-monophonic and adjusting the deformable electronic device accordingly. As described above, in some embodiments, the processor 402 receives a user input to manually adjust the form of the deformable electronic device. The user input may include a force applied to the device to change the form or a selection made at a user interface to indicate another form. In response to detection of the user input to modify the form, the processor 402 updates the deformation parameter. The processor 402 may update the deformation parameter for the current media item or for the next media item presented by the deformable electronic device.

Figure 5:
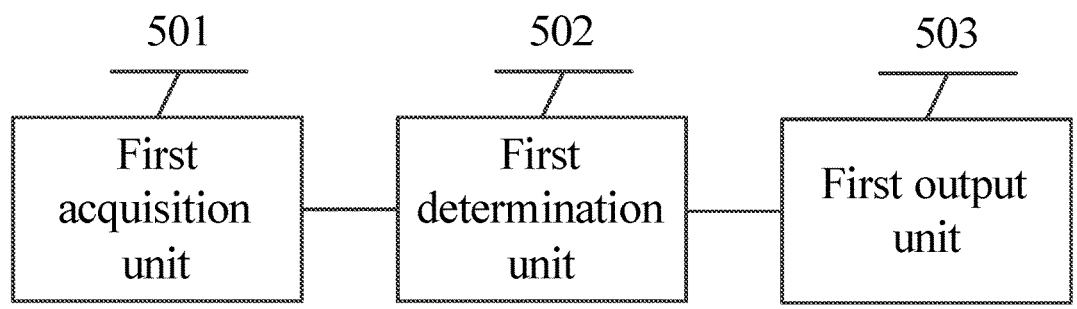
FIG. 5 is a structural view of one embodiment of a deformable electronic system.

Referring to FIG. 5, the embodiment herein further provides a deformable electronic device. The illustrated embodiment includes a first acquisition unit 501, a first determination unit 502, and a first output unit 503. In some embodiments, the first acquisition unit 501 acquires one or more parameters from the multimedia information in response to acquisition of the multimedia information. The first determinating unit 502 determines a deformation parameter for the deformable electronic device based on the one or more acquired parameters. The first output unit 503 controls the deformable electronic device to deform according to the deformation parameter and outputs the multimedia information.

In some embodiments, the first determination unit 502 further includes one or more determination modules to perform various functions. For example, one determination module may determine a multimedia information type from the multimedia information. Another determination module may determine a deformation parameter from the multimedia information type. Another determination module may determine a bend degree for the screen based on the deformation parameter.

In some embodiments, the first determination unit similarly includes one or more determination modules or submodules to perform specific tasks. For example, one determination module may determine a pre-stored deformation parameter based on the multimedia information type. Another determination module may identify a monophonic or non-monophonic type from the multimedia information. Another determination module may provide other functionality.

In some embodiments, the deformable electronic device includes a recording unit to detect and implement a user input deformation at the deformable electronic device. The deformable electronic device may further include a second determination unit to implement the user input deformation as a deformation parameter of the deformable electronic device.

Those skilled in the art should understand that the embodiments described herein may be provided as a method, a system or a computer program product. Therefore, the embodiments described herein may be in the form of a hardware-only embodiment, a software-only embodiment, or an embodiment of a combination of hardware and software. Moreover, some embodiments may be in the form of a computer program product which is implemented on one or more computer available storage media (including, but not limited to, disk storage, CD-ROM, optical storage, and the like) which comprises computer available program codes.

Embodiments described herein are described with reference to the methods, devices (systems) and flow diagrams and/or block diagrams of computer program products according to the various embodiments. It should be understood that computer program commands may be used to implement each process and/or block in the flow diagrams and/or block diagrams, and combinations of processes and/or blocks in the flow diagrams and/or block diagrams. The computer program commands may be provided to a universal computer, a dedicated computer, an embedded processor or the processor of another programmable data processing device to generate a machine, such that the computer or the processor of another programmable data processing device executes commands to generate a unit to implement functions designated in one or more processes in a flow diagram and/or one or more blocks in a block diagram.

The computer program commands may also be stored in a computer readable storage that can cause a computer or another programmable data processing device to work in a specific manner, such that the commands stored in the computer readable storage generates a product comprising a command unit, and the command unit implements functions designated by one or more processes in a flow diagram and/or one or more blocks in a block diagram.

The computer program commands may also be installed in a computer or another programmable data processing device, such that a series of operation steps are executed on the computer or another programmable device to generate a computer implemented processing, and therefore, the commands executed in the computer or another programmable device provide steps for implementing functions designated in one or more processes in a flow diagram and/or one or more blocks in a block diagram.

Specifically, the computer program commands corresponding to the information processing method in the embodiments described herein may be stored in a storage medium such as an optical disk, a hard disk or a USB flash drive, and when the computer program commands in the storage medium corresponding to the information processing method are read or executed by a deformable electronic device, the systems, devices, and methods described above may be executed Although preferred embodiments have been described, those skilled in the art may make additional alterations and modifications on these embodiments with the enlightenment of such basic creative concepts. Therefore, the appended claims are intended to be explained as including the preferred embodiments and all variations and modifications of those embodiments.

It is clear that various variations and modifications to the embodiments described herein may be made by those skilled in the art without departing from the spirit and scope of the present disclosure. Accordingly, if these variations and modifications to the present disclosure fall within the scope of the claims of the present disclosure and the equivalents thereof, it is also intended that the present disclosure encompass these variations and modifications.

What is claimed is:

1. A method comprising:
   acquiring a type parameter of a multimedia information to be output;
   determining a deformation parameter of a deformable electronic device according to the type parameter;
   controlling the deformable electronic device to deform according to the deformation parameter;
   outputting the multimedia information;
   detecting a user deformation of the deformable electronic device;
   acquiring a new deformation parameter in response to detection of the user deformation;
   updating the deformation parameter with the new deformation parameter associated with the type parameter in response to detection of the user deformation of the device; and
   matching the deformation parameter corresponding to the type parameter automatically in the next output.

2. The method according to claim 1, wherein the deformation parameter is a parameter for characterizing a bending degree of a screen of the deformable electronic device.

3. The method according to claim 1, wherein determining the deformation parameter of the deformable electronic device according to the type parameter comprises:
   determining a multimedia information type according to the type parameter;
   determining the deformation parameter corresponding to the multimedia information type by determining a correspondence between the multimedia information type and the deformation parameter.

4. The method according to claim 2, wherein determining the deformation parameter corresponding to the multimedia information type by determining the correspondence between the multimedia information type and the deformation parameter specifically comprises:
   identifying the multimedia information type as an audio multimedia information type associated with a pre-stored deformation parameter, wherein the pre-stored deformation parameter associated with the audio multimedia information type describes a deformation of the deformable electronic device to have a sound output direction from a sound output unit of the deformable electronic device according to the multimedia information type.

5. The method according to claim 4, wherein the type parameter comprises an audio parameter that indicates that the multimedia information is a non-monophonic audio multimedia and the pre-stored deformation parameter describes a deformation of the deformable electronic device to output the non-monophonic audio multimedia.

6. A device comprising:
   a storage unit that stores at least one program module; and
   at least one processor that:
      acquires a type parameter of a multimedia information to be output by acquiring and running the at least one program module;
      determines a deformation parameter of a deformable electronic device according to the type parameter;
      controls the deformable electronic device to deform according to the deformation parameter;
      outputs the multimedia information;

detects a user deformation of the deformable electronic device;

acquires a new deformation parameter in response to detection of the user deformation;

updates the deformation parameter with the new deformation parameter associated with the type parameter in response to detection of the user deformation of the device; and matches the deformation parameter corresponding to the type parameter automatically in the next output.

7. The device according to claim 6, wherein the deformation parameter is a parameter characterizing a bending degree of a screen of the deformable electronic device.

8. The device according to claim 6, wherein the at least one processor further:

determines a multimedia information type according to the type parameter;

determines the deformation parameter corresponding to the multimedia information type by determining a correspondence between the multimedia information type and the deformation parameter.

9. The device according to claim 8, wherein the at least one processor further:

identifies the multimedia information type as an audio multimedia information type associated with a pre-stored deformation parameter, wherein the pre-stored deformation parameter associated with the audio multimedia information type describes a deformation of the deformable electronic device to have a sound output direction from a sound output unit of the deformable electronic device according to the multimedia information type.

10. The device according to claim 9, wherein the type parameter comprises an audio parameter that indicates that the multimedia information is a non-monophonic audio multimedia and the pre-stored deformation parameter describes a deformation of the deformable electronic device to output the non-monophonic audio multimedia.

11. A system, comprising:

a deformable electronic device comprising at least one of a display screen and an audio output, the deformable electronic device further comprising a processor to:

acquire a type parameter of a multimedia information in response to acquisition of the multimedia information to be output;

determine a deformation parameter of the deformable electronic device according to the type parameter;

control the deformable electronic device to deform according to the deformation parameter, and output the multimedia information;

detect a user deformation of the deformable electronic device;

acquire a new deformation parameter in response to detection of the user deformation;

update the deformation parameter with the new deformation parameter associated with the type parameter in response to detection of the user deformation of the device; and match the deformation parameter corresponding to the type parameter automatically in the next output.

12. The system according to claim 11, wherein the deformation parameter is a parameter for characterizing a bending degree of a screen of the deformable electronic device.

13. The system according to claim 11, wherein the processor further:

determines a multimedia information type according to the type parameter;

determines the deformation parameter corresponding to the multimedia information type by determining a correspondence between the multimedia information type and the deformation parameter.

14. The system according to claim 13, wherein the processor further:

identifies the multimedia information type as an audio multimedia information type associated with a pre-stored deformation parameter, wherein the pre-stored deformation parameter associated with the audio multimedia information type describes a deformation of the deformable electronic device to have a sound output direction from a sound output unit of the deformable electronic device according to the multimedia information type.

15. The system according to claim 14, wherein the type parameter comprises an audio parameter that indicates that the multimedia information is a non-monophonic audio multimedia and the pre-stored deformation parameter describes a deformation of the deformable electronic device to output the non-monophonic audio multimedia.

* * * * *